(12) United States Patent
Park et al.

(10) Patent No.: US 10,647,238 B2
(45) Date of Patent: May 12, 2020

(54) CAR CUP HOLDER FOR VEHICLE AND TUMBLER FOR CUP HOLDER

(71) Applicants: Hyundai Motor Company, Seoul (KR); Kia Motors Corporation, Seoul (KR)

(72) Inventors: Jae Woo Park, Ansan-si (KR); Sang Shin Lee, Suwon-si (KR); So Yoon Park, Suwon-si (KR); Man Ju Oh, Yongin-si (KR); Jae Woong Kim, Hwaseong-si (KR); So La Chung, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 406 days.

(21) Appl. No.: 15/641,998

(22) Filed: Jul. 5, 2017

(65) Prior Publication Data
US 2018/0162256 A1 Jun. 14, 2018

(30) Foreign Application Priority Data
Dec. 13, 2016 (KR) .................... 10-2016-0169556

(51) Int. Cl.
*B60N 3/10* (2006.01)
*B65D 85/72* (2006.01)
*B65D 81/18* (2006.01)

(52) U.S. Cl.
CPC ............. *B60N 3/104* (2013.01); *B65D 81/18* (2013.01); *B65D 85/72* (2013.01)

(58) Field of Classification Search
CPC . H05B 6/106; H05B 6/06; H05B 6/40; B60N 3/104; B60N 2/757; B60N 3/101; B60R 7/08
USPC ..... 219/432, 433, 628; 62/3.3, 3.4, 3.6, 3.61
See application file for complete search history.

(56) References Cited

U.S. PATENT DOCUMENTS

2016/0234886 A1* 8/2016 Laghi ..................... H05B 6/06

FOREIGN PATENT DOCUMENTS

KR 10-2015-0058912 A 5/2015

* cited by examiner

*Primary Examiner* — Phuong T Nguyen
(74) *Attorney, Agent, or Firm* — Morgan, Lewis & Bockius LLP

(57) ABSTRACT

A tumbler for use in a car cup holder may include a top-open, bottom-closed, pipe-like internal body for accommodating a beverage; an external body, surrounding the wall of the internal body at a distance to form an internal gap between the external body and the internal body; and a magnetic, metallic heating element disposed at a lower side of the internal body.

7 Claims, 3 Drawing Sheets

CAR CUP HOLDER FOR VEHICLE AND TUMBLER FOR CUP HOLDER

CROSS-REFERENCE(S) TO RELATED APPLICATIONS

The present application claims priority to Korean Patent Application No. 10-2016-0169556, filed on Dec. 13, 2016, the entire contents of which is incorporated herein for all purposes by this reference.

BACKGROUND OF THE INVENTION

Field of the Invention

The present invention relates to a car cup holder and a tumbler for use in the car cup holder by which the temperature of a beverage contained in the tumbler may be maintained at a desired level in a car.

Description of Related Art

A car is generally equipped with a cup holder for accommodating a beverage container. Car cup holders are configured for a simple holding function. Some vehicle models are disposed with cup holders featuring a cooling and warming function in addition to a holding function. However, there are various problems with car cup holders having such a heating or cooling function. Since a car cup holder is generally disposed in a narrow space for the convenience of use, such as an armrest, there is always the risk of an accident such as burning of the user's hand. In addition, the heating or cooling function of the car cup holder may operate even when there is no beverage container present in the car cup holder, resulting in the needless consumption of energy. Therefore, there is a need to overcome such problems.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a car cup holder and a tumbler for use in the car cup holder by which the beverage contained in the tumbler is heated to various desired temperatures, and by which a user is prevented from suffering from a burn.

Various aspects of the present invention are directed to providing a tumbler for use in a car cup holder, including: a top-open, bottom-closed, pipe-like internal body for accommodating a beverage; an external body, surrounding a wall of the internal body at a distance which forms an internal gap between the external body and the internal body; and a magnetic, metallic heating element disposed at a lower side of the internal body.

In an exemplary embodiment of the present invention, the tumbler may further include a wax pellet, disposed within the internal gap, which linearly changes volume in accordance with the temperature of a beverage accommodated in the internal body; and a floating magnet, which floats on and moves with the wax pellet.

In another exemplary embodiment, the floating magnet is disposed along a circumference of the internal body, forming a ring shape.

Various aspects of the present invention are directed to providing a car cup holder for the tumbler, including: a top-open, cylindrical holder body configured for accommodating a tumbler; and an electromagnetic induction heater, disposed in a lower side of the holder body, including a conductive coil for producing an induction current in the heating element.

In one embodiment, the car cup holder may further include a temperature sensor, disposed in a circumference of the holder body, configured for detecting the temperature of a beverage contained in the tumbler depending on the position of the floating magnet; and a controller configured for controlling the operation of the electromagnetic induction heater depending on the beverage temperature detected by the temperature sensor.

In another exemplary embodiment, the temperature sensor has a seesaw structure in which a magnet and a signal device are disposed at respective opposite end portions thereof, and as the sensor's magnet changes position depending on the position of the floating magnet, the signal device generates various signals which represent the temperatures of the beverage.

In another exemplary embodiment, the controller is configured to controls the operation of the electromagnetic induction heater to heat the beverage to a first temperature, a second temperature, or a third temperature depending on the beverage temperature detected by the temperature sensor. When the temperature reaches one of the first to the third temperatures, the controller terminates the operation of the electromagnetic induction heater.

In another exemplary embodiment, the controller detects the floating magnet to determine whether or not a user can grasp the tumbler.

The methods and apparatuses of the present invention have other features and advantages which will be apparent from or are set in more detail in the accompanying drawings, which are incorporated herein, and the following Detailed Description, which together serve to explain certain principles of the present invention.

Figure 1:
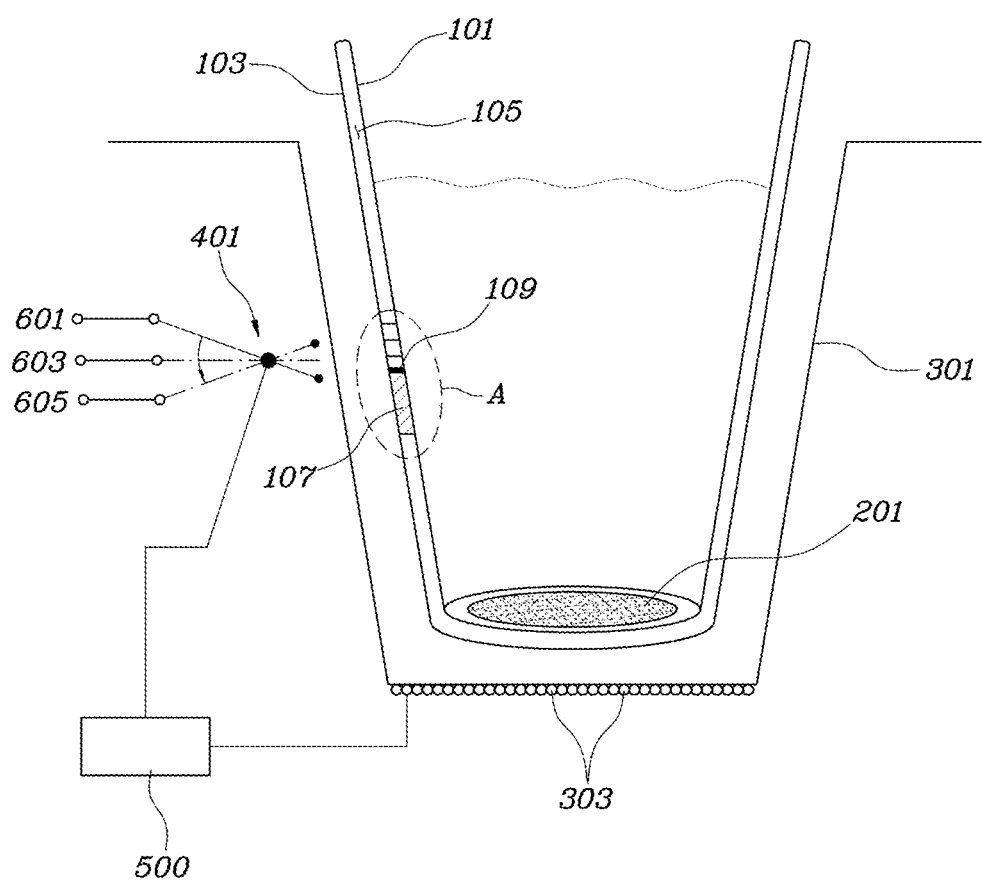
FIG. 1 is a view illustrating a car cup holder and a tumbler for use in a car cup holder according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present descriptions is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
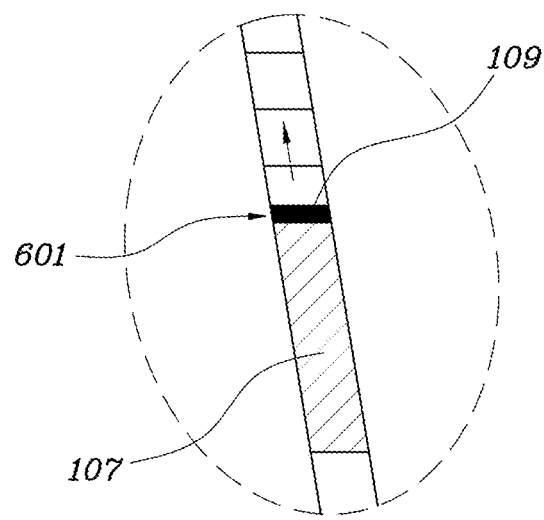
FIG. 2, FIG. 3, and FIG. 4 are views illustrating that a floating magnet of the tumbler changes in position with beverage temperatures in accordance with exemplary embodiments of the present invention.
Figure 3:
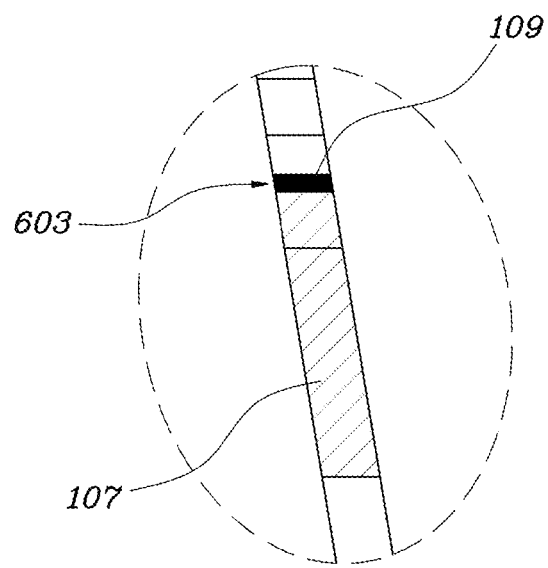
Figure 4:
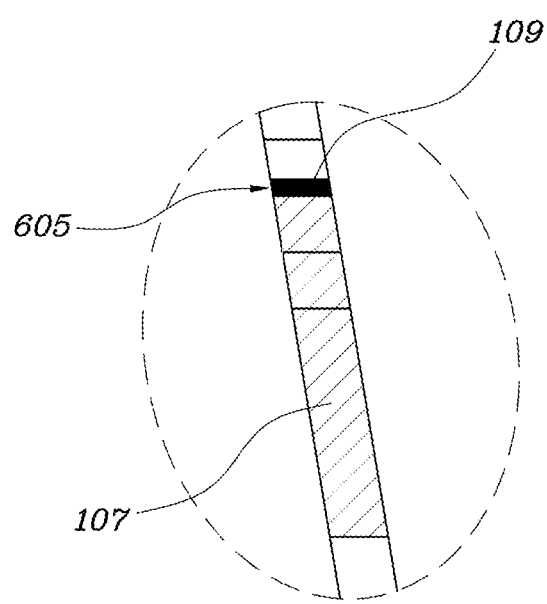

FIG. 1 is a view illustrating a car cup holder and a tumbler for use in a car cup holder. FIG. 2, FIG. 3, and FIG. 4 are views illustrating a floating magnet of the tumbler which changes in position with beverage temperatures in accordance with various embodiments of the present invention.

A tumbler for use in a car cup holder in accordance with the present invention is a top-open, bottom-closed pipe including an internal body 101 configured for accommodating a beverage; an external body 103, surrounding the wall of the internal body 101 at a distance to form an internal gap 105 between the internal body and the external body; and a magnetic, metallic heating element 201 disposed at a lower side of the internal body 101.

A car cup holder for the tumbler of the present invention includes a top-open cylindrical holder body 301 for accommodating the tumbler and an electromagnetic induction heater 303, disposed in a lower side of the holder body 301 and having a conductive coil configured for producing an induction current in the heating element 201.

For a car cup holder with a heating function, a beverage container is heated in an induction manner using a Positive Temperature Coefficient (PTC) element or a thermoelectric element as the heating element 201. In the present case, since the beverage container itself is heated, heat cannot be conducted above a predetermined temperature to prevent the incidence of a burn.

To solve the present problem, a dual-structure tumbler having an insulation layer may be used. However, the contents of a dual-structure tumbler are difficult to heat in an inductive manner. Even when the contents are heated, the holder body 301 of the cup holder is also heated; hence, there still remains the likelihood of a burn incident.

In an exemplary embodiment of the present invention, as shown in FIG. 1, a tumbler for use in a car cup holder has a dual structure including an internal body 101 and an external body 103 in which a magnetic metallic heating element 201 is disposed. The car cup holder is disposed with an electromagnetic induction heater 303 having a coil that can heat the heating element 201 in an electromagnetic induction manner.

In greater detail, when the tumbler is held by the car cup holder and a current passes through the coil of the car cup holder, a magnetic field is formed around the coil. In the presence of a magnetic field, an eddy current is induced in the heating element 201. The heating element 201, having its own resistance, is heated when current runs through the resistor.

As electromagnetic induction, rather than direct induction, is conducted, the tumbler for use in a car cup holder is configured to heat its contents without issue, even though it has a dual structure. In addition, the external body, with which a user's hand comes into contact, is thermally insulated from the internal body 101 by the dual structure, wherein the tumbler prevents the incidence of a burn.

Further, the holder body 301 of the cup holder is not heated and is thus not causative of a burn upon contact therewith, so that it can heat the contents of the tumbler to a higher temperature.

The tumbler may further include a wax pellet 107, disposed within the internal gap 105, which linearly changes volume in relation to the temperature of the beverage accommodated in the internal body 101; and a floating magnet 109 floating on and moving with the wax pellet 107.

The temperature of the beverage contained in the tumbler may be determined before control of the heating element is performed. In an exemplary embodiment of the present invention, as shown in FIG. 1, FIG. 2, FIG. 3, and FIG. 4, the temperature of the beverage is detected using the wax pellet 107 and the floating magnet 109. The wax pellet 107 linearly changes volume in proportion to the beverage temperature and is disposed within the internal gap 105 of the tumbler, while the floating magnet 109 is disposed on the wax pellet 107.

When the beverage is heated, a portion of the heat is transferred to the wax pellet 107. The wax pellet 107 changes volume in proportion to the heat transferred thereto. Therefore, the position of the floating magnet 109 moves in relation to the waxes thermal expansion. The temperature of the beverage can be detected by determining the position of the floating magnet 109 relative to the cup holder.

The floating magnet 109 may be disposed along the circumference of the internal body 101, forming a ring shape.

Forming a ring shape, the floating magnet 109 allows the temperature of the beverage to be detected even when the tumbler is held, irrespective of the position of a temperature sensor 401 disposed in the cup holder.

The tumbler may further include a temperature sensor 401, disposed in the circumference of the holder body 301, configured for detecting the temperature of the beverage depending on the position of the floating magnet 109; and a controller 500 configured for controlling the operation of the electromagnetic induction heater 303 depending on the beverage temperature detected by the temperature sensor 401.

The temperature sensor 401 has a seesaw structure in which, as a magnet disposed at one end portion moves depending on the position of the floating magnet 109, a signal device disposed at the other end portion generates various signals to indicate the temperature of the beverage.

Excessive heating boils the beverage in the tumbler, which is apt to cause an accident and may waste energy. Hence, the controller may stop the operation of the electromagnetic induction heater 303 when the beverage reaches a desired temperature.

In an exemplary embodiment of the present invention, as shown in FIG. 1, the temperature sensor 401 is disposed in the cup holder and has a seesaw structure in which a magnet is provided at one end portion while a signal device is provided at the other end portion. As the floating magnet 109 moves vertically within the internal gap of the tumbler, the magnet of the temperature sensor 401 changes position, with the concomitant positional change of the signal device due to the seesaw structure. The temperature of the beverage can be detected based on the position of the signal device. Through the controller 500, the electromagnetic induction heater 303 is configured to regulate the temperature of the beverage to a desired temperature.

Depending on the beverage temperature determined from the temperature sensor 401, the controller 500 controls the operation of the electromagnetic induction heater 303 to heat the beverage to predetermined temperatures, that is, a first temperature 601, a second temperature 603, or a third temperature 605. When the temperature reaches one of the predetermined temperatures, the controller 500 may terminate the operation of the electromagnetic induction heater 303.

It is ideal to finely control the temperature of the beverage. Beverages that can be contained in the tumbler may be roughly classified into several kinds in consideration of their use in cars. Beverage temperatures suitable for the user to drink may be determined according to their classification, and the temperatures may be used as references to which the beverages contained in the tumbler are preferably heated. Predetermined target temperatures to which beverages will be heated in the tumbler prevents an increase in the production cost of the cup holder and makes it easy to regulate the temperature of the beverage.

In an exemplary embodiment of the present invention, for example, three temperatures may be provided: 40±3° C., as the first temperature 601, suitable for milk for babies; 75±3° C., as the second temperature 603, suitable for storing tea including green or red tea; and 85±3° C., as the third temperature 605, suitable for preparing coffee.

When seated in the cup holder, a tumbler is determined to be or not to be suitable for the operation of the cup holder as the controller 500 detects the presence or absence of the floating magnet 109.

It is important to determine whether a tumbler located in the cup holder is suitable for use in the cup holder of the present invention to operate and control the cup holder according to the design established in an exemplary embodiment of the present invention, preemptively preventing an accident.

Accordingly, a tumbler is determined to be suitable for use in the cup holder when the floating magnet 109 is detected, and then the electromagnetic induction heater 303 is operated, thus preventing an accident that may occur when a container unsuitable for the design of the present invention is seated in the cup holder.

As described hitherto, the car cup holder and the tumbler in accordance with the present invention can maintain temperatures within a wider range compared to a cup holder utilizing a conventional induction technique. The present invention may prevent the incidence of burns as neither the cup holder nor the tumbler is heated at particular areas thereof with which a user comes into contact.

In addition, the temperature of the beverage contained in the tumbler is detected in a non-contact manner and controlled to improve the convenience of the user.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tumbler for use in a car cup holder, comprising:
    a top-open, bottom-closed, and pipe-like internal body configured for accommodating a beverage;
    an external body, surrounding a wall of the top-open, bottom-closed, and pipe-like internal body at a distance to form an internal gap between the external body and the top-open, bottom-closed, and pipe-like internal body;
    a magnetic and metallic heating element disposed at a lower side of the top-open, bottom-closed, and pipe-like internal body;
    a wax pellet, provided within the internal gap, which linearly changes in volume in accordance with a temperature of the beverage accommodated in the top-open, bottom-closed, and pipe-like internal body; and
    a floating magnet, which is configured to float on and move along with the wax pellet.

2. The tumbler of claim 1, wherein the floating magnet is disposed along a circumference of the top-open, bottom-closed, and pipe-like internal body, forming a ring shape.

3. The car cup holder for the tumbler of claim 1, comprising:
    a top-open and cylindrical holder body for accommodating the tumbler; and
    an electromagnetic induction heater, disposed in a lower side of the top-open and cylindrical holder body, including a conductive coil for producing an induction current in the magnetic and metallic heating element.

4. The car cup holder of claim 3, further comprising:
    a temperature sensor, provided in a circumference of the top-open and cylindrical holder body, for detecting the temperature of the beverage contained in the tumbler depending on a position of the floating magnet; and
    a controller configured for controlling operation of the electromagnetic induction heater depending on the temperature of the beverage detected by the temperature sensor.

5. The car cup holder of claim 4, wherein the temperature sensor has a seesaw structure in which a magnet and a signal device are provided at respective opposite end portion thereof, and as the magnet changes in position depending on the position of the floating magnet, the signal device is configured to generate signals that represent temperatures of the beverage.

6. The car cup holder of claim 5, wherein the controller is configured to control operation of the electromagnetic induction heater to heat the beverage to a first temperature, a second temperature, or a third temperature depending on the temperature of the beverage detected by the temperature sensor, and when the temperatures of the beverage reach one of the first to the third temperatures, the controller terminates operation of the electromagnetic induction heater.

7. The car cup holder of claim 4, wherein the controller is configured to detect the floating magnet to determine whether or not a user grasps the tumbler.

\* \* \* \* \*